Feb. 21, 1967      H. WEISS      3,305,717
ELECTRIC MACHINE WITH CONTACTLESS COMMUTATOR
Filed Dec. 19, 1963      2 Sheets-Sheet 1

Feb. 21, 1967   H. WEISS   3,305,717
ELECTRIC MACHINE WITH CONTACTLESS COMMUTATOR
Filed Dec. 19, 1963   2 Sheets-Sheet 2
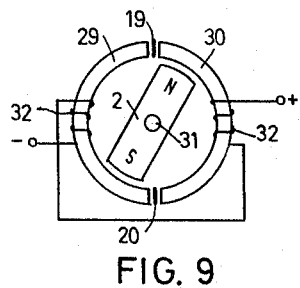
FIG. 9
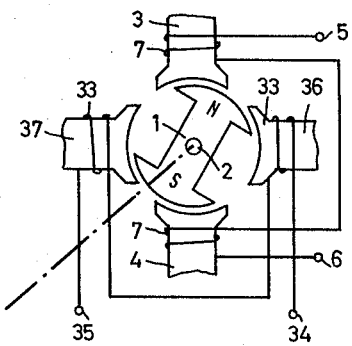
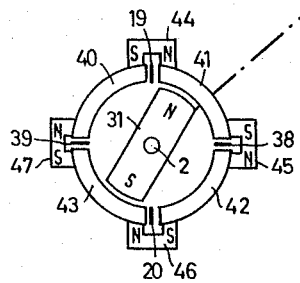
FIG. 10
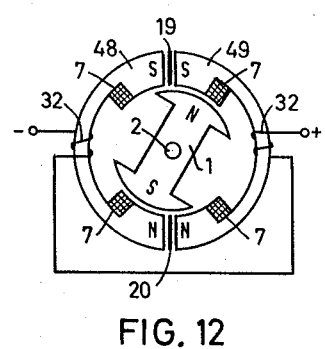
FIG. 12
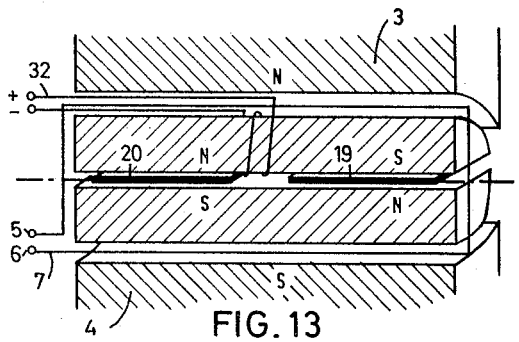
FIG. 11   FIG. 13
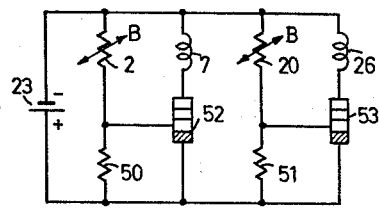
FIG. 14

# United States Patent Office 3,305,717
Patented Feb. 21, 1967

3,305,717
ELECTRIC MACHINE WITH CONTACTLESS COMMUTATOR
Herbert Weiss, Nurnberg, Germany, assignor to Siemens-Schuckertwerke Aktiengesellschaft, Berlin-Siemensstadt and Erlangen, Germany, a corporation of Germany
Filed Dec. 19, 1963, Ser. No. 331,835
Claims priority, application Germany, Jan. 30, 1963, S 83,487
19 Claims. (Cl. 318—254)

My invention relates to electrical rotating machinery, and particularly to such machinery having contactless, and thereby frictionless, commutators.

An electrically rotating machine is generally composed of two mutually movable machine members, namely a stator and a rotor. One of these members produces a rotating field, while the other member may consist of a permanent or electromagnet such as in synchronous or direct-current machines, of a soft-iron core having a preferred magnetic direction such as in a reluctance machine, or of a short-circuit winding wherein a magnetizing current is induced due to the relative motion of the rotating field.

In alternating-current energized machines the frequency of the voltage supplied determines the rotating speed of the rotating field. However, in direct-current machines a current commutator produces an alternating or rotating field and rotating speed of the rotating field depends upon the momentary speed of the moving rotor. The latter characteristic of direct-current machines permits accurate speed regulation. Thus such machines are used widely despite large losses and expenditures connected with the commutator, its wear and tear and the necessary current supply to the movable machine parts. The limited lamellar voltage of the commutator, the friction of the mechanical contact and the resulting losses are disadvantages which can be obviated by means of a contactless commutator.

It is an object of my invention to provide a contactless and thereby frictionless commutating apparatus.

It is another object of my invention to provide a contactless commutator avoiding the above-mentioned difficulties.

According to a feature of my invention, a magnetic-field dependent resistor is connected in the energizing circuit of one of the machine windings and is stationarily located in the air gap of a rotating magnetic circuit induced by a magnet keyed for rotation to one of the moving machine parts so that the magnetic induction depends upon the relative position of the armature to the stator, and furthermore the energizing circuit of the motor includes means for reversing the flux direction of the magnetic field in the machine in dependence upon the momentary resistance value of the magnetic-field dependent resistor.

Preferably the field-dependent resistor is a galvanomagnetic resistor also called a "magnetoresistive" member. Such resistors or members are semiconductor devices in which by virtue of design and geometric features, the occurrence of the Hall effect is suppressed or fully eliminated, with the result that the ohmic resistance of the device increases greatly in response to a magnetic field acting upon the device. Galvanomagnetic resistors are known from U.S. Patent No. 2,984,234 of H. Weiss and H. Welker assigned to the assignee of the present invention. The preferred resistance materials for such resistors are indium arsenide and indium antimonide, especially the latter material which is used in the devices available from the assignee in the form of elongated prismatic bodies having terminals at the respective ends (field plates), as well as in the form of circular discs having one terminal in the center and the other terminal along the periphery (field discs), both types of galvanomagnetic resistors being more fully described in the above-mentioned patent.

These and other features of novelty characterizing the invention will be pointed out in the claims forming part of this specification. Other objects and advantages will become obvious from the following detailed description of several embodiments of the invention when read in light of the accompanying drawings. It will be obvious to those skilled in the art that the invention may be otherwise embodied than hereafter described without departing from its spirit and scope. In the drawings:

FIG. 9 is another embodiment of a magnetic circuit adaptable to FIGS. 1, 4, 5 and 7.

FIG. 10 schematically shows another assembly embodying features of the invention.

FIG. 11 is an electric circuit adapted for control by the machine of FIG. 10.

FIG. 12 is a partial elevation view and partially schematic view of a machine in which the magnetic commutating circuit is built into the machine.

FIG. 13 illustrates another machine embodying features of the invention.

Figure 1:
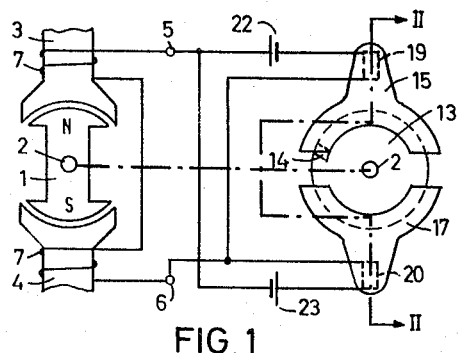
FIG. 1 is a schematic representation of a machine and a magnetic circuit arrangement embodying features of the invention.
Figure 3:
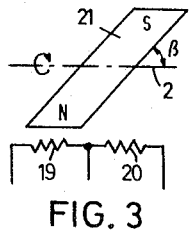
FIG. 3 is another magnetic circuit arrangement adapted for rotational connection to the machine of FIG. 1.

FIG. 14 is an electrical circuit for connecting the magnetoresistive devices in FIGS. 9 to 13 as well as FIGS. 1 and 3.

Figure 2:
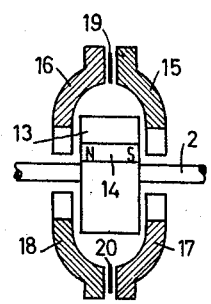
FIG. 2 is a section II—II of FIG. 1.

In FIGS. 1 and 2 a simple magnetic motor comprises a permanent magnet rotor 1 which is secured to a machine shaft 2 between two pole shoes 3 and 4. It will be understood that instead of a permanent magnet armature, a direct-current energized armature can also be used. The pole shoes 3 and 4 are energized by means of a winding 7 having terminals 5 and 6. A disc 13 of nonmagnetic material rotates with the machine shaft 2 and holds on its periphery a permanent magnet 14 whose poles form an axis parallel to the machine shaft. Along a portion of the path traversed by the magnet 14 during rotation of the disc 13, two soft-iron sheets 15 and 16 separated by a gap form a magnetic return path and thus constitute a controlled magnetic circuit. Located in the air gap between the two soft-iron sheets is a magnetic-field dependent i.e. galvanomagnetic, resistor 19 of the type described in the above-mentioned patent. Opposite this controlled magnetic circuit lies a second similarly constructed controlled magnetic circuit comprising soft-iron sheets 17 and 18 sandwiching between them a magnetic-field dependent resistor 20. The magnet 14 as it travels along its circular path between sheets 15 and 16 subjects member 19 to a flux field, thereby raising its resistance. In its path between sheets 17 and 18, the magnet 14 subjects the member 20 to a flux field, during which time it raises its resistance. Thus the resistances of members 19 and 20 are alternately raised by motion of magnet 14 during rotation of shaft 2.

FIG. 3 illustrates a simple arrangement of the control magnet. The magnetic-field dependent resistors 19 and 20 occupy positions next to each other parallel to the machine axis. A control magnet 21 rotatably mounted on the machine axis forms an angle $\beta$ with the axis of the machine shaft 2, the angle $\beta$ being less than 90°, so that the magnetic-field dependent resistors 19 and 20 alternately come within the range of the control-magnetic field as the machine shaft rotates with its keyed control magnet 21. The magnetic return path is not shown in FIG. 3.

Figure 4:
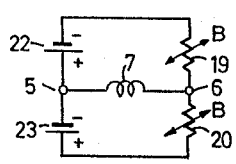
FIG. 4 is a schematic diagram of the electric circuit in FIG. 1 and also applicable to FIG. 3.
Figure 5:
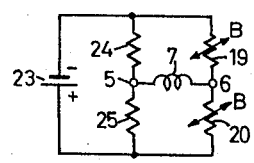
FIG. 5 is another electric circuit adaptable for connecting the magnetoresistive members of FIGS. 1 and 3.

An electrical circuit connecting the magnetic-field dependent resistors 19 and 20 and the machine winding 7 is shown in FIG. 1 and repeated in FIG. 4. A direct-voltage source 22 connects through the magnetic-field dependent resistor 19 across the terminals 5 and 6 of winding 7. A direct-voltage source 23 connects through the magnetic-field dependent resistor 20 across the same machine winding 7 to form a bridge wherein the positive pole of one and the negative pole of the other voltage source connect to the terminal point 5 of the machine winding 7. If two separated or independent direct-voltage sources are not available, the circuit of FIG. 5 is capable of performing the job of FIG. 4. Here the resistors 24 and 25 are connected as a voltage divider across the direct-voltage source and join at their midpoint with the terminal 5 of the machine winding 7. The remaining circuit portion corresponds to FIG. 4. The invention also contemplates improving the circuit of FIG. 5 by making the resistors 24 and 25 also magnetic-field dependent and placing them into the air gap of the control-magnet circuit together with the magnetic-field dependent resistors 19 and 20. It will be understood that the magnetic-field dependent resistors correspond to those in the above-mentioned patent of Weiss and Welker.

In operation as the armature 1 rotates with the shaft 2, it carries with it the disc 13. As the disc 13 moves the magnet 14 past the sheets 15 and 16, it energizes a magnetic-field dependent path through the magnetic resistor 19 so that its resistance and voltage drop increases. Thus the current applied to the winding 7 comes mainly from the source 23 and flows basically between the terminals 6 to 5 through the lower resistance of the resistor 20. When the rotation of the disc 13 positions the permanent magnet 14 between the soft-iron sheets 17 and 18, the magnetoresistive member 20 is magnetized and exhibits a high impedance whereas the resistor 19, then in its unmagnetized state, exhibits a low impedance. Thus most of the current through the winding 7 then comes from the source 22 and passes in the direction from the terminal 5 to the terminal 6. This reversal of current tends to turn the magnetic armature 1 even further in the manner of an ordinary direct-current electric motor.

In FIG. 5 the reversal of high-magnetic resistance from high resistance 19 to high resistance 20 causes the current first to flow from source 23 through low resistance 20, terminal 6, winding 7, terminal 5 and resistor 24, and then from source 23 through resistor 25, terminal 5, winding 7, terminal 6, low resistance 19 and back to the source 23.

Figure 6:
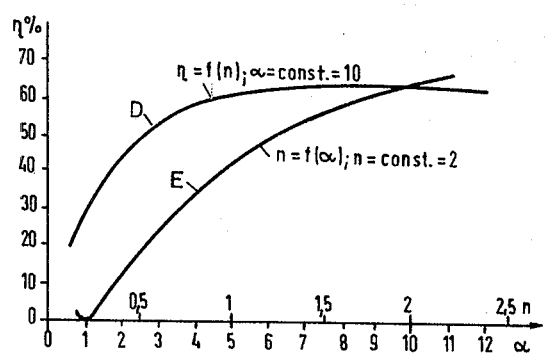
FIG. 6 is a graph showing the efficiency of the circuit in FIG. 4.

FIG. 6 is a graph illustrating the efficiency $\eta$ of the circuit in FIGS. 1, 2 and 4 depending upon the factors $n$ and $\alpha$ which affect the resistance $R_m$ of the magnetic-field dependent resistors 19 and 20. Here the resistance $R_m$ varies between a minimum $nR/\alpha$ and a maximum $nR\alpha$, and R is the ohmic resistance of the machine winding 7. The inductive reactance of the field winding 7 is negligible and thereby omitted. The efficiency $\eta$ of the apparatus is the ratio of the consumption of power in the field winding 7 to the total power consumed. Curve D illustrates the course of efficiency in dependence upon the factor $n$ where $\alpha=10$. Curve E illustrates the dependence of the efficiency upon the factor $\alpha$ when $n=2$.

Figure 7:
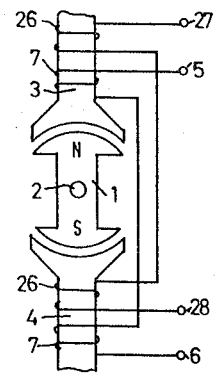
FIG. 7 illustrates another machine to which the magnetic circuits of FIGS. 2 and 3 are applicable.
Figure 8:
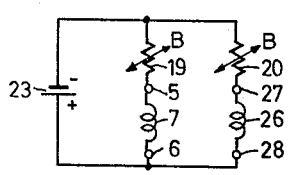
FIG. 8 illustrates an electric circuit adapting the magnetic circuit of FIG. 2 to the machine of FIG. 7.

The embodiment of FIG. 7 corresponds substantially with that of FIG. 1. The stator here, however, carries two windings, namely the winding 7 with terminals 5 and 6 and the winding 26 with terminals 27 and 28, whose winding directions are different. The motor shown in FIG. 7 connects to the magnetic circuit in FIG. 1 and 2 through shaft 2. The applicable electric circuit for this arrangement is shown in FIG. 8. Here the direct-voltage source 23 connects across the magnetic-field dependent resistor 19 in series with the winding 7 and also connects across the magnetic-field dependent resistor 20 which is in series with the machine winding 26. The winding 26 may have the same winding direction as winding 7. In such a case the position of the magnetically dependent resistor 20 would be reversed with that of the winding 26. In FIGS. 7 and 8, when the resistance of the galvanomagnetic resistor 19 is high and that of the resistor 20 is low, current flows mainly through the winding 26 producing a magnetic condition in the pole shoes 3 and 4 tending to rotate the armature 1. Upon the armature completing its rotation 180°, the resistor 20 then exhibits a high resistance or impedance and the winding 7 is then effective to again rotate the armature 1 on its shaft 2 as well as the disc 13.

All these circuits have the function of reversing the flux direction in the machine in relation to the rotary speed by changing one or more of the galvanomagnetic resistors. This, as stated, is achieved in the case of circuits illustrated in FIGS. 4 and 5 by reversing the flow of current in the winding 7, and in the circuit illustrated in FIG. 8 by creating differences in the fluxes induced by the windings 26 and 7.

FIG. 9 is another embodiment of a magnetic circuit to replace that of FIG. 2 in FIG. 1. This consists of a permanent magnet 31 mounted on the machine shaft 2 and rotating within a ring composed of two semicircular cores between which corresponding air gaps are arranged with the magnetic-field dependent resistors 19 and 20 positioned in said air gaps. In addition, a direct-current energized biasing winding 32 is wound symmetrically about the ring. This bias winding causes premagnetization in the galvanomagnetic resistor 20 which in the illustrated position of the permanent magnet 1 adds to the magnetic flux, whereas in the air gap of the magnetic-field dependent resistor 19 the differences in the fluxes are active.

By means of the symmetrical arrangement of the winding 32, the voltage pulses induced by the poles of the controlling magnet 31 are mutually cancelled.

FIG. 10 illustrates a machine wherein in addition to the poles 3 and 4 opposite each other, two poles 36 and 37 perpendicular to the pole shoes 3 and 4 support an additional winding 33 having terminals 34 and 35. The shaft 2 rotates a magnet 31 within four magnetic cores 40, 41, 42 and 43. Between these cores which occupy quadrant arcs are arranged the magnetoresistors 19 and 20 opposite each other as well as two additional magnetoresistive elements 38 and 39 diametrically opposite each other. The galvanomagnetic resistors 38 and 39 are connected to the winding 33 while the resistors 19 and 20 are connected with the machine winding 7. This is illustrated in FIG. 11. Four permanent magnets 44, 45, 46 and 47 are placed across each gap as shown. The operation of the device in FIGS. 10 and 11 corresponds to that of FIG. 1.

FIG. 12 illustrates a machine wherein the magnetic commutator is mounted on the machine structure. Such an embodiment is particularly advantageous for small machines. Here the magnetic circuit of the motor is identical with the controlling magnetic commutator circuit. The machine stator consists of two semicircular soft magnetic segments 48 and 49 embracing the galvanomagnetic resistors 19 and 20 in the air gaps formed thereby. The field winding 7 and the bias winding 32 are mounted in notches. The resistors 19 and 20 are connected as shown in FIG. 4 and reverse the current in winding 7 the same way.

Another embodiment is shown in FIG. 13. Here the rotor of the machine is composed of two semicylindrical shells, sandwiching between them the galvanomagnetic resistors 19 and 20 which rotate together with the rotor. The biasing winding 32 and the field winding 7 are also mounted on the rotor. Current is supplied either by means of slip rings, not shown, or directly if the rotor remains stationary and the stator rotates. The galvanomagnetic resistors are connected to a direct-current supply source and to the winding 7 according to one of the circuits illustrated in FIGS. 4, 5 and 8.

FIG. 14 illustrates another circuit comparable to that of FIG. 8. It is particularly suitable for machines of higher efficiency and operates with a machine such as shown in FIG. 7 having a magnetic circuit as in FIGS. 2 or 9. Here the windings 7 and 26 are connected as the load of two transistors 52 and 53 whose base-emitter circuits are controlled by the condition of the resistors 19 and 20. Parallel to the direct-current supply 23 is a voltage divider composed of resistance 50 and the galvanomagnetic resistor 19, and a voltage divider composed of an ohmic resistance 51 and the galvanomagnetic resistor 20. The junctions between the resistances of these two voltage dividers connect with the bases of the respective transistors 52 and 53, whose emitter-collector paths are serially connected with the field windings 7 and 26, respectively, and which are also arranged parallel to the direct-current supply 23. As the resistors 19 and 20 are alternately magnetized by rotation of the armature the current flow in respective transistors 52 and 53, and hence windings 7 and 26, is alternately suppressed. This commutation causes further armature rotation. Moreover, it is possible to connect additional amplifier-components between the field winding and the circuit which contains the galvanomagnetic resistors.

All the previously-described rotor types are applicable in the machine illustrated here. With a short-circuited rotor the slip must appear in the rotor, as well as in the controlling magnetic circuit. Thus, a permanent magnet, or a circular soft-iron core which is magnetized by the armature current, must be provided in the control-magnet circuit and connected with the rotor shaft by a drive. The latter arrangement is especially suitable because, as in the case of the induction machine, the current supply to the movable machine part is omitted.

I claim:

1. In an electric machine having a stator, a rotor, and winding means, a contactless commutator comprising a controlling magnetic circuit having a field gap and having a magnetic part coupled to and rotatable with the rotor for varying the magnetic flux in said gap in dependence upon the position of the rotor relative to the stator, galvanomagnetic resistor means mounted in said gap having an electrical resistance varied in response to magnetic flux variations in said field gap, and an excitation circuit having a polarity-reversible portion including said winding means, said galvanomagnetic resistor means being connected in said circuit for reversing the excitation polarity of said winding means in dependence upon the resistance variation of said resistor means.

2. In an electric machine having a stator, a rotor, and winding means, a contactless commutator comprising a controlling magnetic circuit having a field gap and having a magnetic part coupled to and rotatable with the rotor for varying the magnetic flux in said gap in dependence upon the position of the rotor relative to the stator, galvanomagnetic resistor means mounted in said gap having an electrical resistance varied in response to magnetic flux variations in said field gap, and a multi-branch resistance bridge circuit having extreme potential points and mid-potential points and including said galvanomagnetic resistor means in one of the branches, said winding means being connected between the mid-potential points, whereby when said galvanomagnetic resistor means is intermittently magnetized the excitation polarity of said winding means is alternated.

3. In an electric machine having a stator, a rotor, and winding means, a contactless commutator comprising a controlling magnetic circuit having a field gap and having a magnetic part coupled to and rotatable with the rotor for varying the magnetic flux in said gap in dependence upon the position of the rotor relative to the stator, galvanomagnetic resistor means mounted in said gap having an electrical resistance varied in response to magnetic flux variations in said field gap, a pair of series-connected voltage sources, a voltage divider including said galvanomagnetic resistor means connected across said series-connected voltage means, said machine winding means being connected between the respective junction points of said sources and said voltage divider.

4. In an electric machine having a stator, a rotor, and winding means, a contactless commutator comprising a controlling magnetic circuit having a field gap and having a magnetic part coupled to and rotatable with the rotor for varying the magnetic flux in said gap in dependence upon the position of the rotor relative to the stator, galvanomagnetic resistor means mounted in said gap having an electrical resistance varied in response to magnetic flux variations in said field gap, said winding means having two oppositely-wound parallel-connected windings, direct voltage means for energizing said windings, said galvanomagnetic resistor means being connected in series with one of said windings.

5. In an electric machine having a stator, a rotor, and winding means, a contactless commutator comprising a controlling magnetic circuit having two field gaps and having a magnetic part coupled to and rotatable with the rotor for varying the magnetic flux in said gaps in dependence upon the rotor position relative to the stator, separate galvanomagnetic resistor means mounted in each gap having an electrical resistance varied in response to respective magnetic flux variations in each gap, said winding means having two oppositely-wound parallel-connected windings, direct voltage means for energizing said windings, each of said galvanomagnetic resistor means being connected in series with a corresponding one of said windings.

6. In an electric machine having a stator, a rotor, and winding means, a contactless commutator comprising a controlling magnetic circuit having two field gaps and having a magnetic part coupled to and rotatable with the rotor for varying the magnetic flux in said gaps in dependence upon the rotor position relative to the stator, separate galvanomagnetic resistor means mounted in each gap having electrical resistances varied in response to respective magnetic flux variations in each gap, biasing winding means on said magnetic circuit for premagnetizing said galvanomagnetic resistor means whereby said magnetic part increases and decreases the flux through said galvanomagnetic resistor means depending upon the position of said part, and an excitation circuit having a polarity-reversible portion including said winding means, said galvanomagnetic resistor means being connected in said circuit for reversing the excitation polarity of said winding means in dependence upon the resistance variation of said galvanomagnetic resistor means.

7. In an electric machine having a stator, a rotor, and winding means, a contactless commutator comprising a controlling magnetic circuit having two semiannular cores set together to form a ring having two diametrically opposing air gaps and having a magnetic part coupled to and rotatable with the rotor for varying the magnetic flux in said gaps, said part being mounted for rotation on the axis of said ring and having diametrically opposed poles, a pair of galvanomagnetic resistor means each positioned in a corresponding one of said air gaps and each having an electrical resistance varied in response to magnetic flux variations in the corresponding air gap, flux biasing means having a biasing winding with a pair of winding portions for imparting a flux in said ring in one direction so as to establish a given resistance value in each of said galvanomagnetic resistor means, said part varying the flux in said gaps so as to vary the magnitudes of said electrical resistance, and an excitation circuit having a polarity-reversible portion including said winding means, said galvanomagnetic resistor means being connected in said circuit for reversing the excitation polarity of said winding means in dependence upon the resistance variation of said galvanomagnetic resistor means.

8. An electric machine comprising a stator, a rotor, a plurality of field winding pairs, a controlling magnetic circuit having a magnetic part coupled to and rotatable with said rotor, a plurality of pole pairs and a plurality of air-gap pairs corresponding in number to said pole pairs, said magnetic part varying the flux in said gaps as it rotates, a plurality of galvanomagnetic resistor means each mounted in a corresponding one of said gaps and each having an electrical resistance which varies in response to magnetic flux variations in said field gap, and an excitation circuit having polarity reversible portions each including one of said winding pairs, said galvanomagnetic resistor means being connected to said circuit for reversing the excitation polarities of said winding pairs in dependence upon the resistance variations of said galvanomagnetic resistor means.

9. In an electric machine having a stator, a rotor, and winding means, a contactless commutator comprising a controlling magnetic circuit having a field gap and having a magnetic part coupled to and rotatable with the rotor for varying the magnetic flux in said gap in dependence upon the position of the rotor relative to the stator, galvanomagnetic resistor means mounted in said gap having an electrical resistance varied in response to magnetic flux variations in said field gap, transistor amplifier means connected to said galvanomagnetic resistor means for sensing the changes of resistance therein, said winding means being connected in the load of said amplifier means so as to be excited according to changes in the resistance of said galvanomagnetic resistor means.

10. An electric machine, comprising a multipole stator having a plurality of poles and peripheral spaces between the poles, a magnetic rotor, winding means, galvanomagnetic resistor means mounted in the peripheral spaces between the poles of said stator, a biasing winding on said stator for passing flux through said galvanomagnetic resistor means, said rotor upon rotation varying the flux in said galvanomagnetic resistor means, and an excitation circuit having a polarity-reversible portion including said winding means, said galvanomagnetic resistor means being connected in said circuit for reversing the excitation polarity of said winding means in dependence upon the resistance variation of said galvanomagnetic resistor means.

11. An electric machine comprising a stator, a rotor having two semicylindrical portions forming an air gap between them, winding means, galvanomagnetic resistor means mounted in said gap, a biasing winding on said rotor for passing magnetic flux through said galvanomagnetic resistor means, said rotor upon rotation varying the magnetic flux in said galvanomagnetic resistor means, and an excitation circuit having a polarity-reversible portion including said winding means, said galvanomagnetic resistor means being connected in said circuit for reversing the excitation polarity of said winding means in dependence upon the resistance variation of said galvanomagnetic resistor means.

12. An electric machine comprising a pair of mutually movable magnetically interlinked motor means, winding means, one of said motor means including a magnetic part, the other of said motor means forming a magnetic path for said magnetic part and including an air gap in which the magnetic flux varies upon relative movement of said motor means, galvanomagnetic resistor means mounted in said gap having an electrical resistance varied in response to the magnetic flux variations in said field gaps and an excitation circuit having a polarity-reversible portion including said winding means, said galvanomagnetic resistor means being connected in said circuit for reversing the excitation polarity of said winding means in dependence upon the resistance variation of said galvanomagnetic resistor means.

13. In an electric machine having a stator, a rotor having an axis for rotating about said axis, winding means and an excitation circuit connected to said winding means for providing an excitation current for exciting said winding means, a contactless commutator comprising a magnetic circuit having two field gaps and a magnet in operative proximity with said field gaps and coupled to and rotating with said rotor about said axis for varying the magnetic flux in said field gaps in accordance with the angular position of said rotor; and a pair of galvanomagnetic resistors connected in the excitation circuit of the winding means of said electric machine, each of said galvanomagnetic resistors being positioned in a corresponding one of the field gaps of said magnetic circuit whereby the electrical resistance of each of said galvanomagnetic resistors alternates in magnitude between a minimum and a maximum and the excitation current is alternately reversed in accordance with the magnitude of the resistance of said galvanomagnetic resistors.

14. A contactless commutator in an electric machine as claimed in claim 13, wherein said field gaps are formed by a pair of yokes spaced from the axis of said rotor and immovably mounted, each of said yokes comprising a pair of yoke portions spaced from each other to form a field gap, and said magnet has an axis parallel to and spaced from the axis of said rotor.

15. A contactless commutator in an electric machine as claimed in claim 13, wherein said galvanomagnetic resistors are coplanarly positioned in a plane transverse to the axis of said rotor.

16. A contactless commutator in an electric machine as claimed in claim 13, wherein said galvanomagnetic resistors are positioned adjacent each other substantially parallel to the axis of said rotor.

17. A contactless commutator in an electric machine as claimed in claim 16, wherein said magnet has an axis inclined at an angle with the axis of said rotor, said magnet being positioned so that in rotating with said rotor it alternately varies the magnetic flux at said galvanomagnetic resistors.

18. A contactless commutator in an electric machine as claimed in claim 13, wherein said rotor comprises a pair of spaced semicylindrical portions forming a field gap between them, and said galvanomagnetic resistors are positioned adjacent each other in the direction of the axis of said rotor and substantially parallel to the axis of said rotor.

19. A contactless commutator in an electric machine as claimed in claim 18, further comprising a biasing winding wound on one of said semicylindrical portions, the other of said semicylindrical portions comprising a magnetic yoke and being included in said magnetic circuit.

References Cited by the Examiner

UNITED STATES PATENTS

| | | | |
|---|---|---|---|
| 2,226,847 | 12/1940 | Clark | 338—32 X |
| 2,536,805 | 1/1951 | Hansen | 310—49 X |
| 2,719,944 | 10/1955 | Brailsford | 318—138 X |
| 2,797,376 | 6/1957 | Meade | 318—138 X |
| 2,924,633 | 2/1960 | Sichling et al. | |
| 3,210,631 | 10/1965 | Niccolls | 318—254 |

ORIS L. RADER, *Primary Examiner.*

B. DOBECK, *Assistant Examiner.*